July 7, 1942.　　　A. J. FISCHER　　　2,289,112
COMBINED FLOCCULATION AND CLARIFICATION
Filed May 4, 1940　　　2 Sheets-Sheet 1
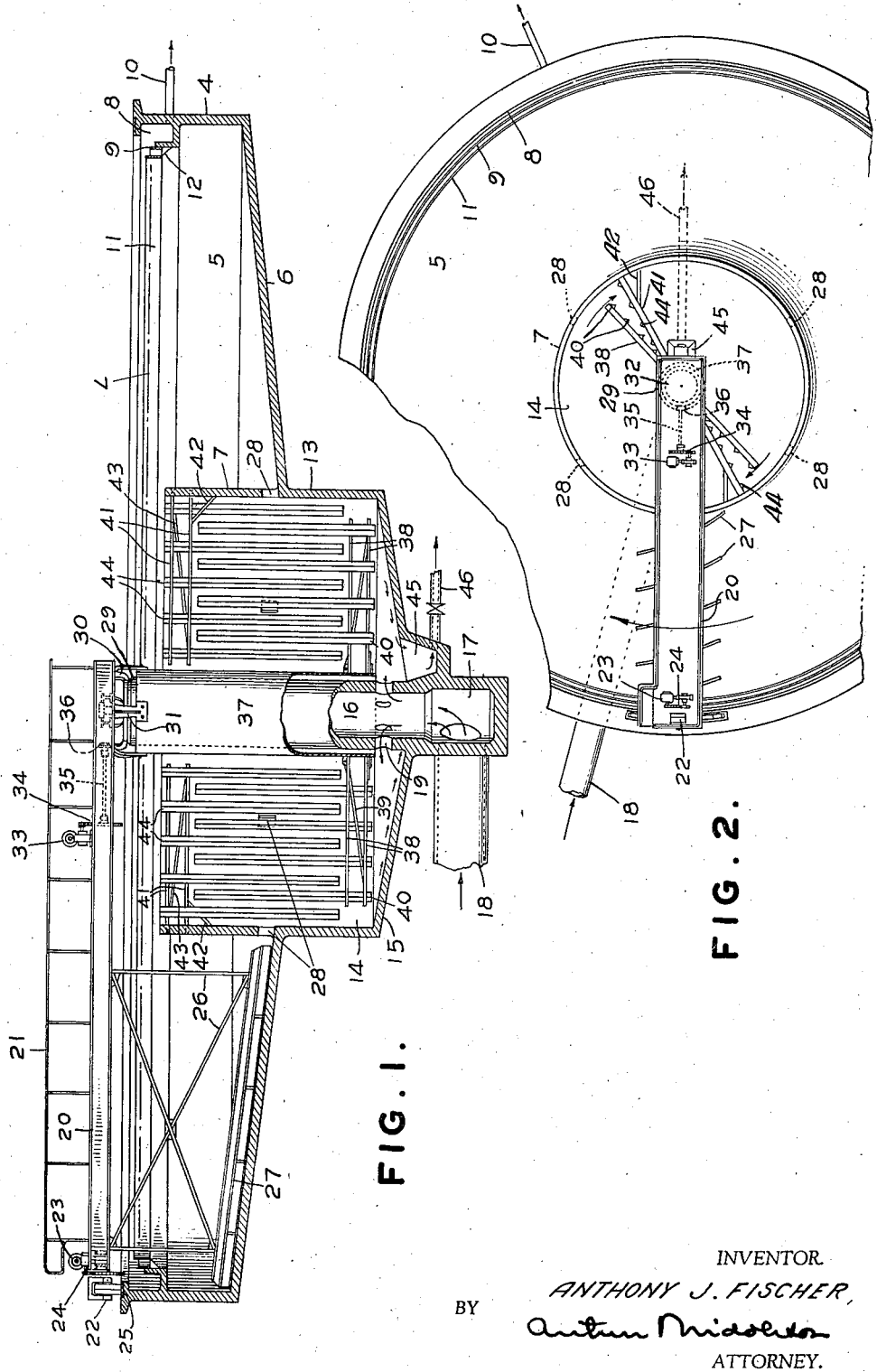
INVENTOR.
ANTHONY J. FISCHER,
BY
ATTORNEY.

July 7, 1942.  A. J. FISCHER  2,289,112
COMBINED FLOCCULATION AND CLARIFICATION
Filed May 4, 1940  2 Sheets-Sheet 2

INVENTOR.
ANTHONY J. FISCHER,
BY
ATTORNEY.

Patented July 7, 1942

2,289,112

UNITED STATES PATENT OFFICE 2,289,112

COMBINED FLOCCULATION AND CLARIFICATION

Anthony J. Fischer, Flushing, N. Y., assignor to The Dorr Company, Inc., New York, N. Y., a corporation of Delaware Application May 4, 1940, Serial No. 333,310

7 Claims. (Cl. 210—12)

This invention relates to the treatment of liquids and, more particularly, to the treatment of liquids containing solids in suspension and in solution. Specifically the invention contemplates a novel means and mode of operation thereof for the conditioning of liquids containing suspended or precipitated solids of a very finely divided nature, for promoting and encouraging the agglomeration or amassment of such solids, particularly those of a colloidal and crystalloidal nature, into aggregates or flocs of a readily settleable condition. It also contemplates the removal from the liquid medium of such thus agglomerated masses in the form of a relatively dense sludge.

In the treatment of liquids for the removal therefrom of suspended solids, particularly those of such minute size that their exceedingly slow settling rate renders their removal from the liquid menstruum impractical by sedimentation alone, the phenomenon known as flocculation has long been recognized. The behaviour of particles of matter evidenced by flocculation may be influenced in several manners. One such manner consists in relieving the electric potential of the particles, generally by chemical means, which permits them to be collided by agitation. Particles may be caused to adhere to one another merely by bringing them into intimate contact mechanically, the latter action being particularly true with respect to particles of organic origin. The bringing of such particles into intimate contact and the gradual growth of the same into flocs of settleable size and condition may be accomplished by a continued relatively gentle agitation of the liquid suspension. It is also known that, where chemicals are used to induce the flocculation or amassment of minute particles, such gentle mechanical agitation is of material assistance in promoting the formation and growth of the desired floc structure.

It is further known that the presence in the suspension to be flocculated, of previously formed flocs, in the form of floc structures retained in the body of liquid or in the form of sludge introduced into the liquid to be treated after having been removed by sedimentation from previously treated liquid, materially assists in and hastens the formation and growth of the desired floc structures in the suspension undergoing the flocculation treatment. This is true whether or not chemical means are employed to encourage the coagmentation, since the retained floc structures and returned sludge act as nuclei to which the minute particles in the untreated liquid may become attached and adhere.

Thus it will be appreciated that for the most efficient flocculation or agglomeration action a gentle but definite agitative condition is desirable. On the other hand, it will readily be recognized that for the removal of the flocculated matter from the mother liquid by sedimentation a state of quiescence is required. Thus in early flocculation-sedimentation practices the flocculation operation was carried out in one tank and the flocculated liquid then transferred to a second tank for quiescent settling, in some instances provision being made for return of settled sludge from the sedimentation tank to the flocculation tank. One inherent disadvantage of such practice is the tendency for the destruction of or damage to the delicate floc structures during the transition period, thus nullifying to a considerable extent the effects of the flocculation treatment. Attempts have been made to eliminate this difficulty by incorporating the flocculation and sedimentation zones in a single unitary tank structure. While some of such efforts have met with a good deal of success, certain factors have generally been present which interfere with the ideal result theoretically attainable. For instance, in some of these structures the retention of floc nuclei within or the return of sludge to the flocculation zone has presented difficulties. In other arrangements the feeding of incoming liquid to be treated has not been accomplished in the most satisfactory manner. In still other arrangements it has been impossible to provide a sedimentation zone of sufficient area to effect rapid and efficient settling of the flocculated solids.

It is a prime object of the present invention to overcome some or all of the above enumerated and other difficulties heretofore experienced in flocculation-sedimentation practices and to provide for the carrying out of these operations in an efficient, economical and highly satisfactory manner.

A further object of the invention is to provide a flocculation-sedimentation apparatus in which the flocculation and sedimentation zones are housed within a single unitary structure, preferably providing circular sections which are substantially concentrically arranged and wherein a good supply of floc nuclei in the form of retained floc structures as well as returned settled sludge may be descended into and held in the flocculation zone.

Another object is to provide a combination flocculation-sedimentation apparatus wherein the incoming feed to be treated is introduced upflowingly into the flocculation or agitation zone and within a body of relatively dense sludge maintained therein.

Still another object of the invention is to provide a combination flocculation-sedimentation device wherein all of the solids settling in the sedimentation zone are conveyed and impelled toward and into a lower level flocculation zone and wherein all of the sludge of solids removed from the apparatus is emitted from the flocculation zone.

With these and other objects in view the invention consists in the construction and novel combination and arrangement of parts set forth in the following description of a specific embodiment, shown in the accompanying drawings and particularly pointed out in the claims hereto appended, it being understood that various changes in the form, proportions and minor details of construction may be resorted to, within the scope of the claims, without departing from the spirit of the invention or sacrificing any of the advantages thereof.

In the drawings:

Figure 1 is a sectional elevation substantially through the center of a combined flocculation-sedimentation apparatus embodying features of the present invention.

Figure 2 is a fragmentary plan view on a somewhat reduced scale of the apparatus shown in Figure 1.

Figure 3:
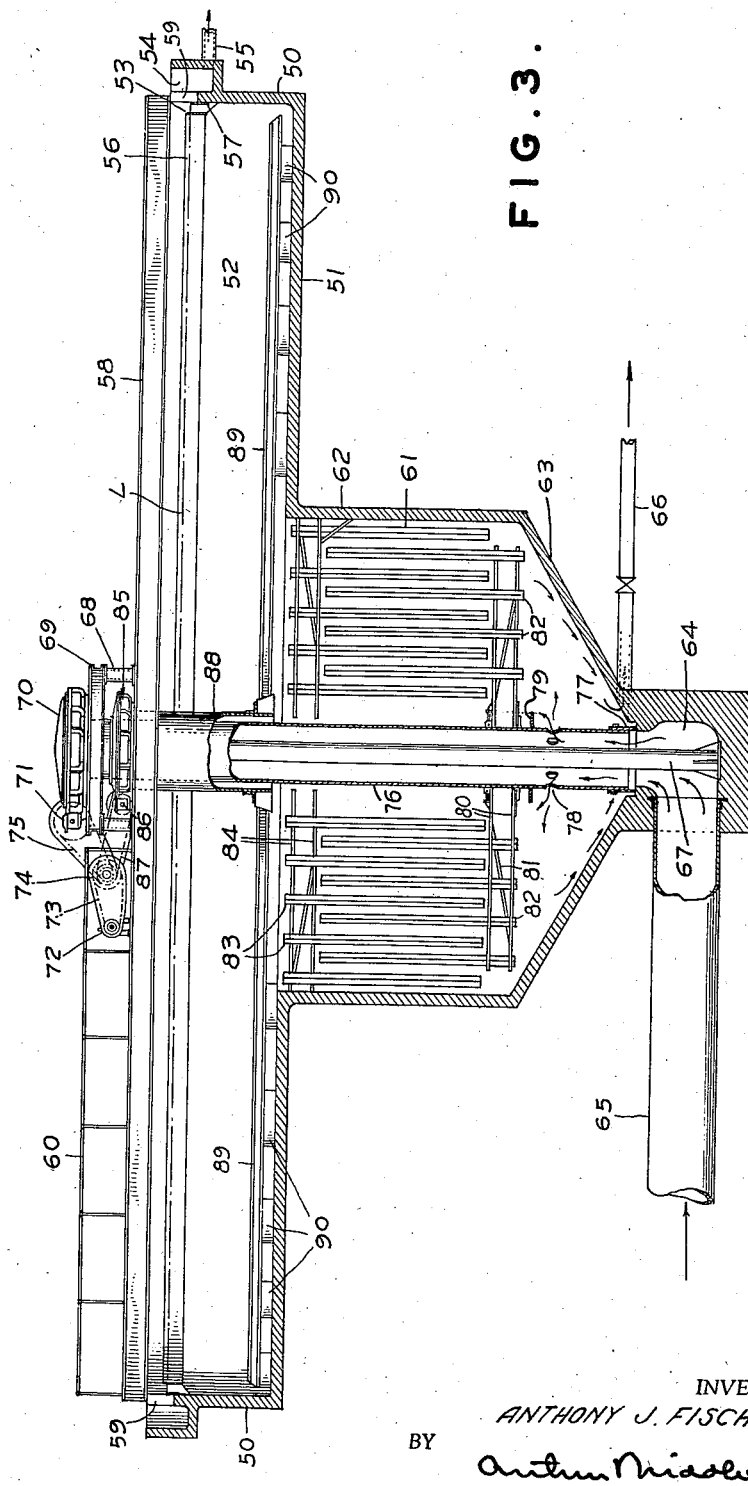
Figure 3 is a sectional elevation similar to Figure 1 but showing a modified form of the flocculation-sedimentation device of the present invention.

In a very general way the apparatus of the present invention may be said to belong to the class of devices as exemplified by the structures shown and described in the patent to G. M. Darby et al., No. 2,143,750 and the application for patent of H. J. Talbot et al., Serial No. 327,886. In this respect it will be noted that the apparatus of the present invention comprises a flocculation zone and a sedimentatiton zone in cooperative relationship within a single tank structure, the flocculation zone in the preferred embodiment being located within the lateral confines of the sedimentation zone and substantially concentric therewith. The present invention also partakes of some of the aspects of the type of apparatus of the G. M. Darby et al. application for patent, Serial No. 311,840, now Patent No. 2,259,221, in that the sedimentation zone is superposed upon or at a higher elevation than the flocculation zone or at least the major portion thereof. The apparatus and mode of operation of the present invention, while in certain respects partaking of some of the advantages inherent in the aforementioned disclosures, presents considerably enhanced advantages and features of construction and operation as will be manifest as the following detailed description unfolds.

Referring first to the embodiment shown in Figures 1 and 2, there will be seen a round vertical wall 4 which is generally constructed of concrete and which defines the outer boundary of the entire apparatus and also of the sedimentation zone or section 5. The sedimentation zone is further defined by a bottom 6, which may be horizontal or which may slope somewhat downwardly as herein shown to where it terminates at another round vertical wall 7 which is preferably concentrically arranged with respect to the outer boundary wall 4 although preferably not as high as the latter, which rises vertically from the sedimentation zone bottom 6, and which also forms the outer boundary of the flocculation zone presently to be described. Thus it will be seen that the sedimentation section 5 is, in effect, in the form of an annulus, since the settling action takes place principally in the area between the walls 4 and 7. The sedimentation zone is provided with a peripheral launder 8 arranged along the inside of the boundary 4 near the top thereof to carry off clarified liquid overflowing an adjustable weir 9, the clarified liquid being ultimately discharged through pipe 10, all in a manner well known in the art. For the purpose of discouraging the overflow of scum, which may sometimes appear upon the surface of the liquid within the sedimentation zone, there may be provided a peripheral scum baffle 11 which extends parallel to the overflow weir 9 spaced a short distance laterally therefrom and preferably adjustably supported from the launder 8 by suitable brackets 12. Since the scum baffle 11 is arranged to project above the upper edge of the weir 9, and thus above the normal liquid level of the sedimentation zone, it will be apparent that the overflowing liquid must first pass under the scum baffle and then over the weir 9, thus discouraging the discharge of floating scum with the overflow liquid.

In the form of the invention shown in Figures 1 and 2 the flocculation zone, in addition to being located concentrically with respect to the sedimentation zone, extends upwardly into the said zone and also extends downwardly therefrom below the bottom 6 thereof. As previously mentioned, the wall 7 defines that portion of the flocculation zone which extends upwardly within the sedimentation chamber, while a second round wall 13 extends downwardly from the tank bottom 6 and is preferably in vertical alignment with the wall 7, the two walls thus defining the outer boundary of the flocculation or agitation zone generally indicated by the numeral 14. This flocculation zone is open at the top so that the treated liquid suspension may upflow or drift therefrom into the sedimentation zone, and is provided with a bottom wall 15 preferably sloping downwardly toward the center. From approximately the center of the flocculation zone there rises a stationary hollow pier or column 16 which extends through the flocculator bottom 15 in direct communication with a feed supply chamber 17 which is in turn in open communication with a pipe or main 18 through which there is maintained a flow of incoming liquid to be treated. Somewhat above the bottom 15 and within the flocculation zone 14 the vertical feed supply conduit or column 16 is provided with a radially arranged series of ports or openings 19 through which the incoming liquid may escape to the flocculation zone. This arrangement for the feed of incoming material forms an important feature of the invention and will be elaborated upon presently.

In addition to serving as a feed conduit, the pier or column 16 also functions as a support or pedestal whereon are operatively supported the sludge raking or conveying instrumentalities and the devices for maintaining an agitative condition within the flocculation zone 14. At the top of the pedestal 16, which latter may be solid or otherwise closed if desired at any point above the feed outlets 19, there is provided a suitable anti-friction pivot means for rotatably or pivotally supporting the inner end of a horizontal beam or platform structure 20, the upper surface of which may constitute a walkway, for which purpose it may be provided with a hand rail 21. The rotating beam or truss 20 extends substantially to the peripheral wall 4 of the apparatus and is provided at its outer end with a rotatable traction wheel 22 adapted to be powered driven through the instrumentality of an electric motor 23 and appropriate gearing 24. The traction wheel 22 rests upon a suitable track 25 carried by the upper edge of the tank wall 4. Operation of motor 23 and traction wheel 22 will cause the beam or truss 20 to travel around the tank in a manner well known in the art.

Depending from the beam 20 is a supporting framework 26, suitably trussed as shown, which carries at its lower end a series of sludge scrapers or rakes 27 preferably of the well known Dorr type. These sludge rakes, upon rotation of the beam 20 and supporting framework 26, are operative around and across the bottom of the sedimentation zone 5 to rake and impel sludge settled upon the tank bottom 6 in a direction away from the peripheral wall 4 and toward the wall 7 of the flocculation zone. This wall 7 is provided, adjacent the point where it rises from the tank bottom 6, with a plurality of openings or ports 28. Coincident with the continual impelling of settled sludge or sediment toward and against the wall 7 such sludge will eventually be forced through the openings 28 and into the flocculation zone 14.

In addition to serving as a center support for the above described traction or peripheral drive sludge raking mechanism, the central column 16 also supports a rotatable stirring mechanism which imparts the desired agitative conditions to the contents of the flocculation zone. For this purpose the upper surface of the pedestal 16 supports a stationary annular bearing member 29 upon which is rotatably mounted a bearing ring 30 carrying a series of downwardly depending brackets or fingers 31. The upper surface of the bearing ring 30 carries a series of teeth in the form of a bull ring gear 32. Mounted upon the truss or beam 20 is an electric motor 33 adapted, through the medium of gearing 34, shaft 35 and pinion 36 meshing with the bull gear 32, to rotate the bearing plate 30 and depending fingers 31.

Attached to and supported by the fingers 31 is a tubular member or cage 37 which surrounds the column 16 and extends downwardly therearound to terminate at a locality adjacent to or slightly above the ports 19. Adjacent its lower end the tubular member or cage 37 carries one or more horizontally and radially extending arms 38 which are attached to the cage by suitable brackets and steadied or strengthened by appropriate guying elements 39. Carried by the arms 38 in rigid fashion are a plurality of upright agitating blades 40 which are spaced laterally from one another and which are preferably substantially V-shaped in cross section. All of the blades or stirrers 40 are positioned so that the apexes of the V's point in the direction of travel when the stirrers are rotated coincident with rotation of the cage 37 and carrier arms 38 in the normal operation of the apparatus.

While the utilization solely of the rotating or traveling stirring blades as just described will in some instances suffice to maintain the desired agitative condition within the flocculation zone, it will generally be desirable to provide a series of stationary blades, similar in construction and shape to the blades 40 and intermeshing therewith. For this purpose there extend horizontally from substantially diametrically opposite points on the interior of wall 7, and adjacent the open upper edge thereof, the stationary supporting arms 41 which may be strengthened by braces 42 and guys 43. Rigidly attached to the arms 41 and depending downwardly therefrom are a plurality of stationary blades 44 which are substantially V-shaped in cross-section and are laterally spaced so that the travelling stirrers 40 may pass between adjacent blades 44 in the manner readily apparent in Figure 1. The provision of the stationary blades and their cooperative relationship with respect to the travelling stirring blades discourages swirling of the contents of the flocculation zone and materially assists in maintaining the ideal agitative condition. The cooperation of the stationary and travelling blades also causes the fine suspended particles to assume circumambient paths and thus provides opportunity for the maximum of collisions between the minute particles and the floc nuclei to effect the desired colonizing or amassing of the particles. In this connection, it is preferred that both sets of blades be substantially V-shaped in cross-section with the apexes of the traveling blades pointing in the direction of travel and the apexes of the stationary blades faced in the opposite direction. This arrangement shown and claimed in greater detail in patent application Serial No. 310,373, now Pat. 2,274,361 assures a gentle but positive stirring action without the abrupt cleavage of the liquid that may occur with otherwise shaped blades, which might in some instances tend to disrupt delicate floc structures. It is to be understood, however, that the V-shape is merely the preferred form for the purposes of the invention and obviously both the travelling and the stationary blades may assume other cross-sectional shape that might be desired or convenient.

As has been previously indicated, all of the sludge or solids removed from the liquid by the functioning of the present apparatus is discharged directly from the flocculation zone. For this purpose there is provided in the bottom 15 of the flocculation zone 14, preferably adjacent the base of the column 16, a sludge sump 45 from which there extends a valved sludge discharge pipe 46. The sludge of solids or sediment accumulating in the lower part of the flocculation zone 14, below the agitated section thereof, will collect in the sump 45 from where it can be discharged continuously or periodically through the discharge pipe 46, either by pumping or by the action of gravity.

The apparatus of the present invention is particularly efficacious in the treatment of sewage or of other liquids containing solids and colloids of flocculatable nature. Such liquids frequently readily lend themselves to satisfactory clarification solely by means of the mechanical agitative flocculation hereinbefore described, and subsequent sedimentation, without the use of any added chemicals for assisting the coagmentation of the solids, provided the proper type of agitation is utilized. It is to be understood, however, that the invention is equally applicable in the treatment of other types of liquids which contain flocculatable solids. Thus the invention may be practiced with equal success upon sewage or other waste liquids which have been chemically or otherwise treated to induce flocculation or coagmentation, and can also be successfully utilized in the treatment of any liquid containing flocculatable or agglomeratable solids, such as mineral and chemical pulps and the like. In the event that chemical treatment is desired to assist flocculation, or for other purpose, the necessary chemicals may be incorporated in the suspension prior to admission to the apparatus, or suitable provision may be made for injecting chemicals into the material within the flocculation zone 14.

For the purpose of convenience only, the operation of the present apparatus will be described in connection with the treatment of raw sewage. The raw sewage, which may or which may not have been treated by a preliminary or primary sedimentation operation for the removal of readily settleable solids, enters the supply chamber 17 from the main 18 and flows upwardly through the vertical supply conduit 16 and outwardly therefrom through the ports 19 and into the flocculation zone 14. As will presently be observed, there will generally be, within the lower portion of the flocculation zone and surrounding the ports 19, a stratum of relatively dense flocculated solids. This dense stratum forms in effect a blanket into which the incoming raw sewage is introduced from the ports 19. The new feed is thus subjected initially to what may be termed a blanket filtration effect, whereby some of the suspended solids in the feed are trapped before the liquid is released into the section under the agitative influence of the travelling stirrers 40.

Travelling upwardly the liquid enters and upwardly transits the main portion of the flocculation zone 14 which is in a gentle agitated condition due to the revolving of the carrier arms 38 and the stirring blades 40, in cooperation with the stationary blades 44 as previously described. Within this agitative section there is also a good supply of retained floc structures which have grown to such size that they are not carried upwardly from the flocculation zone and into the sedimentation, and also settled sludge which is being continuously returned to the flocculation zone from the sedimentation zone 5 through the ports 28, all serving as nuclei for the attraction and anchoring of the fine suspended particles in the new feed. Within this agitated zone the unflocculated particles are caused to collide with one another and with the said floc nuclei and thus increase the size and settleability of each nucleus and form new flocs which will readily yield to sedimentation in the settling zone 5. In the treatment of raw sewage without the aid of added chemical coagulants the speed of travel of the stirrers 40 should not exceed about 1.5 feet per second for the most effective results. It has been found that this character of agitation affords provision for a maximum of collisions amongst the particles with a minimum tendency toward disruption of or damage to the delicate floc formations.

Passing upwardly from the flocculation zone 14 the flocculated liquid drifts and spreads gradually out into the sedimentation zone 5, whose normal liquid level is maintained at about the line L, determined by the height of the overflow weir 9. Since the sedimentation zone is functionally separated from the agitated zone 14, by the wall 7, and by virtue of the fact that it is located outside of any substantial influence from the agitative means, a state of quiescence prevails within the zone 5, wherefore the flocculated solids settle upon the bottom 6 by the action of sedimentation, a substantially clarified liquid overflowing the weir 9 and passing from the apparatus. With the sludge raking mechanism in operation as previously described, the rakes 27 impel and convey the settled sludge toward the wall 7 where it is eventually forced through the ports 28 and into the flocculation zone 14 to serve as nuclei in the flocculation operation. Thus a goodly supply of solids is maintained within the flocculation zone at all times. When the returned sludge particles, and in fact any particles in the flocculation zone, become of sufficient size their tendency is to drop out of the liquid within the agitated area and gravitate to the lower unagitated portion of the zone 14. There will thus be built up in the small area between the bottom 15 and the lower ends of the stirrers 40 a blanket or layer of relatively dense settled sludge, which will also accumulate in the sump 45 from which it can be withdrawn continuously or intermittently as desired. Obviously, by controlling the discharge of sludge through the valved outlet 46 the height and density of the sludge blanket can be controlled at will.

With regard to the accumulation and maintenance of a relatively large amount of sludge in the blanket adjacent the bottom of the flocculation zone, it has generally been the belief that a large body of organic sludge in contact with sewage would soon turn septic and sour the entire tank contents. While this may be true of sludge in quiescent contact with sewage, it is found as a part of this invention that when the sludge is constantly mixed with fresh sewage, which is accomplished by the continuous feed of raw sewage through the ports 19, decomposition products in the sludge are continually washed away so that the sludge may be held in situ for a relatively long period without deleterious results. As previously indicated, the amount and density of the sludge blanket may be controlled by the sludge discharge. If it is desired to discharge a very thick sludge, this may be done periodically by shutting down the agitating mechanism and thus allow quiescent conditions to prevail within the flocculation zone 14, whereupon a thick sludge will settle toward the bottom 15 and accumulate in the sump 45 from whence it can be removed.

Figure 3 of the drawings illustrates a somewhat modified form of the apparatus of the present invention. In the characterization of this figure the flocculation zone, while concentrically located with respect to the sedimentation zone, is positioned at a level entirely below the same with no part projecting into the sedimentation section. Also in this modification there is shown an arrangement whereby the sludge raking and the agitating assemblies are each rotatably driven by the application of power at central bearing points.

In this embodiment of the invention a vertical round wall 50 and a tank bottom 51, herein shown to be flat but which may slope toward the center if desired, define the sedimentation or quiescent settling zone 52. For the purpose of decanting clarified supernatant liquid there is provided the peripheral adjustable weir 53 over which the liquid flows into the launder 54 and ultimately to discharge through the pipe 55. As in the previously described form of the invention there may be provided a scum baffle 56 supported by the brackets 57. A pair of parallel that specifically the principal characteristics include a sedimentation zone concentrically arranged with respect to a flocculation zone with the sedimentation zone generally higher than the flocculation zone and substantially greater in cross-sectional area. Thus there is provided a unitary structure containing a flocculation zone wherein the liquid may be confined and treated in a relatively small area under conditions designed to promote the most efficient coagmentation of minute particles, into settleable floc structures. The treated liquid is released into a sedimentation zone of considerably greater cross-sectional area and, since the two are in open and hydraulic communication, the flow from one to the other is exceedingly gentle so that there is substantially no chance for damaging the delicate floc structures.

In either form of the invention as illustrated the tank bottom may be viewed as made up of a low bottom section (15 of Fig. 1) or 63 of Fig. 3) defining the lower boundaries or floor of an immediately overlying deep flocculation or agitation zone; an intermediate section (13 of Fig. 1 or 62 of Fig. 3) in the form of an upstanding wall rising from the marginal portion of the low bottom section; and an upper bottom section at elevation higher than that of the low bottom section and defining the lower boundaries or floor of an immediately overlying sedimentation zone. In each form shown a marginal or outer boundary wall (4 of Fig. 1 or 50 of Fig. 3) rises from the tank bottom thus defined and completes the tank, or as otherwise expressed, the liquid-holding portion of the tank. In each form illustrated the tank bottom thus made up of the low bottom section, the rising intermediate section or wall-like portion, and the bottom section at higher elevation comprises sections connected in a step-like arrangement, or as otherwise expressed, so as to provide a step-wise formation. It will also be noted that within the deep flocculation or agitation zone there is provided agitation means comprising movable bladed members or paddles (as 40 of Fig. 1). These movable blades are therefore disposed so as to move within the deep zone immediately overlying the low bottom section, to wit, within that zone which is marginally defined by the rising intermediate section or intermediate boundary wall.

It will also be noted that all feed passing into the apparatus is delivered into that region of the agitation or flocculation zone which is below the paddles, that sediment within the outlying or surrounding sedimentation zone is mechanically raked and returned from the floor of that zone past or through the rising intermediate section or wall into the flocculation zone, namely, within the region of the flocculation zone wherein it is agitated by the paddles so as to mingle with the rising solids and liquid in said flocculation or agitation zone.

It will also be noted that solids in said zone exist as solids in suspension in the liquid within said zone, to wit, as a blanket within the flocculation zone. Accumulated solids are passed from an elevation of the agitation zone which is lower than that of the upper floor section. It will also be noted that the overflow weir which is provided as part of the effluent launder for the sedimentation zone determines the elevation of the liquid in the tank for both the flocculation or agitation zone and the sedimentation zone since said zones are in constant hydraulic communication because of passage area provided over the rising intermediate bottom section whereby there is permitted a lateral transfer of the upflowing flocculated or agitated liquid from the flocculation zone into the sedimentation zone.

Another important characteristic is the return of all sludge from the sedimentation zone to the flocculation zone and the eventual removal of sludge from the latter zone, so that all sludge settled from the liquid descends in the flocculation zone and assures the presence therein of a maximum of floc nuclei. Since the densest sludge eventually accumulates in the lower portion of the flocculation zone below the agitative influences, a sludge blanket is formed which exerts a filtration effect upon the incoming feed that upwardly transits the flocculation against solids descending therein. The introduction of the new feed into the accumulated sludge, on the other hand, retards septic action in the sldge and enables a substantial accumulation to be maintained without deleterious effects upon the contents of the apparatus.

Certain specific driving arrangements for the moving parts have been illustrated and described but it is to be understood, of course, that these elements form no part of the invention and may be altered or interchanged at will, it being obviously sufficient that some satisfactory means be utilized for effecting rotation of the sludge raking and the agitating assemblies.

What is claimed is:

1. In combined flocculation and sedimentation apparatus a flocculation zone defined in part by a bottom and in part by an upstanding intermediate boundary wall; a sedimentation zone surrounding at least a portion of said flocculation zone and defined in part by a bottom extending laterally from said upstanding intermediate boundary wall and from that portion of the boundary wall which is intermediate its upper and lower extremities and in part by a marginal wall rising from the peripheral portion of said last mentioned bottom; said flocculation zone being open at its top whereby flocculated liquid may flow upwardly therefrom and spread driftingly into said sedimentation zone; means for introducing into the bottom portion of the flocculation zone a feed of liquid to be treated; means for gently agitating in the flocculation zone the liquid undergoing treatment therein for promoting the amassment of minute particles in the liquid into settleable flocs; means in the sedimentation zone for permitting the overflow of substantially clarified liquid; means associated with said sedimentation zone for impelling solids settled upon the bottom thereof towards its juncture with the intermediate boundary wall of said flocculation zone; openings in said intermediate boundary wall through which said settled solids may pass into said flocculation zone and means for discharging sedimented soilds from the latter zone.

2. Combined flocculation and sedimentation apparatus comprising a tank structure having in hydraulic communication a sedimentation zone and a flocculation zone, which flocculation zone is defined by a low bottom and an upstanding wall; said sedimentation zone being defined by a bottom at elevation higher than that of the said low bottom, extending laterally from the exterior portion of the upstanding wall, and providing an effective settling area surrounding the area of the flocculation zone, and a marginal wall rising from the marginal edge portion of beams 58 spans or bridges the tank 52, supported at opposite points on the peripheral wall 50 by means of suitable steps 59. These beams are for the purpose of supporting central bearing and motivating means, as will presently appear, and also provide a walkway with hand railing 60 for access to be had to the center mechanism.

The flocculation or agitation zone 61 of the present modification is encompassed within a round wall 62 extending downwardly from the bottom 51 of the sedimentation zone and concentrically arranged with respect to the latter zone, the flocculation zone being entirely open at the top to merge vertically into the sedimentation zone. The flocculation zone is provided with a downwardly and inwardly sloping bottom 63 which terminates adjacent its center in a feed supply chamber 64 which receives the feed of liquid to be treated from the supply conduit or main 65. A valved sludge discharge pipe 66 extends from an opening in the bottom 63 whereby sludge may be withdrawn from the apparatus as desired.

Anchored at the base of supply chamber 64 and extending upwardly therefrom through the flocculation and sedimentation zones is a stationary column 67 which serves as a steadying element and partial support for the center driving mechanism as will presently appear. Mounted upon the bridge beams 58 is a raised platform provided by pairs of parallel beam sections 68 and 69 which serves as a support for a bearing assembly and housing 70, which latter may also derive some of its support from the upper end of column 67. The bearing assembly 70 comprises a stationary annular bearing surface which rotatably supports an annular rotatable bearing member having gear teeth about its periphery so that it may be rotated by a worm within the housing 71. The details of this preferred bearing and driving arrangement are set forth in the patent to Scott No. 2,087,725. For the purposes of the present invention suffice it to say that the rotatable bearing member in the housing 70 is adapted to be rotatably driven through the medium of an electric motor 72, chain or belt 73, idler 74 and chain or belt 75 which are effective to operate the worm drive within the housing 71.

Depending from the driven bearing member in the housing 70 is a tubular element 76 which surrounds the stationary column 67 and extends downwardly to a point adjacent the exit opening or feed supply chamber 64. At its lower open end the member 76 is preferably provided with a sealing boot 77, preferably of rubber, Neoprene or similar flexible material, for the purpose of forming a substantially liquid tight seal with an appropriate horizontal step at the point where the feed supply chamber 64 communicates with the flocculation zone 61. The tubular member 76 is provided toward its lower end, and preferably below the locality of the stirring blades presently to be described, with a radially arranged series of ports or openings 78 through which the liquid to be treated may enter the lower part of the flocculation zone. A horizontal baffle plate 79 may surround the member 76 just above the ports 78 to encourage radial distribution of the incoming feed and discourage short-circuiting thereof.

Secured to the tubular member 76 are the radially extending carrier arms 80 steadied by suitable guys 81. These arms support the upwardly extending stirring blades 82 which are preferably of the V-shaped form and the arrangement described in connection with Figures 1 and 2. It will be seen that rotation of the tubular member 76 by the motor and driving arrangement described will cause the stirring blades 82 to travel in a circular path in the flocculation zone. As in the form of Figures 1 and 2, the present modification is preferably provided with the stationary vertical blades 83 carried by arms 84 rigidly attached to the interior of the wall 62 at appropriate points, the stationary blades intermeshing and cooperating with the moving blades 82 as previously described.

The bridge beams 58 also serve to support a second housing or assembly 85 containing fixed and rotatable annular bearing members and associated worm drive 86, similar in every respect to the bearing and driving assembly 70. The worm 86 is adapted to drive the rotatable element within the housing 85 by power transmitted from the motor 72 through the medium of belt or chain 73, idler 74 and chain or belt 87. It is to be understood that the idler element 74 may contain pulleys or sprockets of different sizes so that the rotatable bearing members may be driven at different speeds. Carried by the rotatable bearing element in the housing 85 is a relatively short tubular member 88 which surrounds the tubular member 76 and extends downwardly to a point slightly above the plane in which the bottom 51 of the sedimentation section lies. Adjacent its lower end the tubular member 88 carries radial arms 89 which extend across the bottom 51 and terminate just short of the peripheral wall 50. These arms carry sludge scrapers or rakes 90 preferably of the well known Dorr type which are adapted, upon rotation of the tubular member 88 and the rake arms 89, to impel and convey solids settled upon the bottom 51 away from the wall 50 and toward the center where they are eventually caused to fall or cascade over the edge of bottom 51 where it merges with the peripheral wall 62 of the flocculation zone 61 and thus be returned to the flocculation zone.

The operation and effect of the modification just described are substantially the same as in the apparatus of Figures 1 and 2. In the present modification it will be seen that the new feed, which may be raw sewage or any other flocculatable suspension, enters the lower and unagitated portion of the flocculation or agitation zone 61 through the inlet ports 78 which may be surrounded with a blanket of relatively dense sludge as hereinbefore explained. The feed then passes upwardly and is subjected to the gentle agitative influence of the blades 82 and 83 in the presence of floc structures too large or heavy to rise with the gentle upward flow into the sedimentation zone, and sludge returned to the flocculation zone by the raking elements 90. Passing upwardly from the flocculation zone the flocculated liquid drifts into the sedimentation zone 52 where the flocculated solids settle upon the bottom 51 and are continuously conveyed toward and back into the flocculation zone by the rakes 90, a substantially clarified liquid overflowing the weir 53 and being discharged through pipe 55. The accumulation of sludge in the lower portion of the flocculation zone 61 will gravitate over the sloping bottom 63 toward the bottom central portion where it is prevented from escaping into the supply chamber 64 by means of the sealing boot 77. This sludge may be continuously or periodically withdrawn through valved pipe 66 in the manner previously described.

In either form of the invention it will be seen said higher bottom; vertically disposed rotatable bladed assemblies in said flocculation zone for gently agitating liquid undergoing treatment therein adapted for promoting the amassment of solid particles suspended in the liquid into settleable flocs; means for introducing a feed of liquid to be treated into said flocculation zone at a point below said bladed assemblies past which the liquid upflows in transit to said sedimentation zone; means in the sedimentation zone providing the overflow of substantially clarified liquid; means associated with said sedimentation zone for transferring settled solids from the bottom thereof towards and into said flocculation zone, and means for discharging sedimented solids from a portion of said latter zone which is at elevation lower than that of the bottom of the sedimentation zone.

3. A liquid-treating apparatus comprising a liquid-holding tank having a bottom embodying a lower floor section defining the lower boundary of a deep agitation zone, a rising intermediate section, and an upper floor section defining the lower boundary of a sedimentation zone, which said rising section connects said upper and lower floor sections in step-wise formation, and a marginal wall rising from said bottom for completing the liquid-holding portion of the tank; outflow means for passing liquid from the sedimentation zone providing an overflow weir that determines the normal surface level of the liquid within the tank; agitating means having paddles operable in said agitation zone movable in the regions thereof at elevation lower than that of said upper floor section; means for actuating said agitating means; the structures which define said zones being so associated with respect to each other that liquid containing solids suspended therein passes from said agitation zone to said sedimentation zone; means for delivering incoming liquid to be treated to said agitation zone at an elevation sufficiently low whereby the thus delivered liquid upflows into the paths of movement of the paddles; and means for transferring sediment from said upper floor section towards as well as past said rising section and thence into said agitation zone whereby incident to the operation of said paddles there is effected a commingling of the incoming feed with the returned sediment as well as with those solids that are in suspension in the agitation zone.

4. Apparatus according to claim 3, in which said rising intermediate section has a portion extending upwardly within the sedimentation zone but terminating at an elevation lower than that of the overflow weir, and in which the rising intermediate section is provided with sediment-transfer passages extending therethrough.

5. Apparatus according to claim 3, in which as part of the rising intermediate section there is provided a section extending upwardly from the region proximate the inner edge portion of the upper settling floor to an elevation lower than that of the overflow weir.

6. Apparatus according to claim 3, in which the rising intermediate section includes a section rising to an elevation higher than that of the settling floor of the sedimentation zone but terminating at an elevation lower than that of the overflow weir and provided with passage area leading from the lower portion of the sedimentation zone into the flocculation zone.

7. Combined flocculation and sedimentation apparatus comprising a tank having a bottom providing an upper annular settling floor section, a lower central floor section and an intermediate section rising from the margin of the lower central floor section at least to the upper annular settling floor section thereby completing the bottom of the tank, and a boundary wall rising from said upper annular floor section marginally defining over said annular floor section a sedimentation zone; said intermediate section rising from the lower central floor section marginally defining over the lower central floor section a flocculation zone that is in constant hydraulic communication with the sedimentation zone; means for feeding liquid into the flocculation zone; means having an overflow weir for the release of clarified effluent from the sedimentation zone and for determining the normal level of the liquid in both said zones; means for passing sediment-bearing liquid from the flocculation zone to a locality outside of the tank; means for agitating the liquid within the flocculation zone for thereby promoting amassment of suspended particles into settleable flocs; means for introducing feed liquid into a low portion of the flocculation zone whereby the liquid thus supplied passes upwardly within the operative influence of the agitating means; and sediment-conveying means for impelling sedimented material from diverse portions of said annular settling floor section into the flocculation zone.

ANTHONY J. FISCHER.